April 18, 1939.  R. M. KENAH  2,155,274
MANUFACTURE OF COMPOSITE METALLIC STRUCTURES
Filed Dec. 21, 1934   2 Sheets-Sheet 1
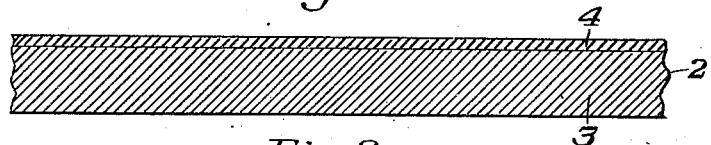
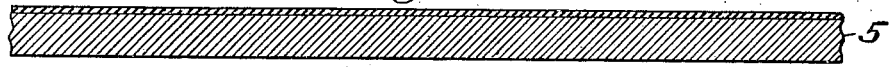
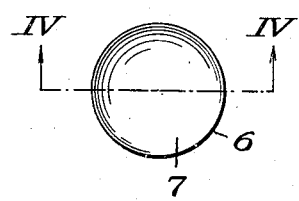
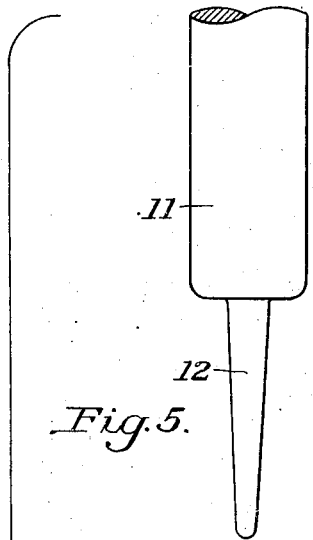
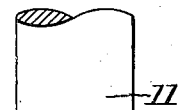
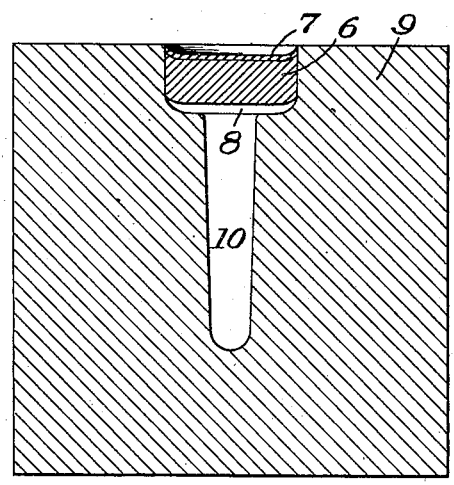
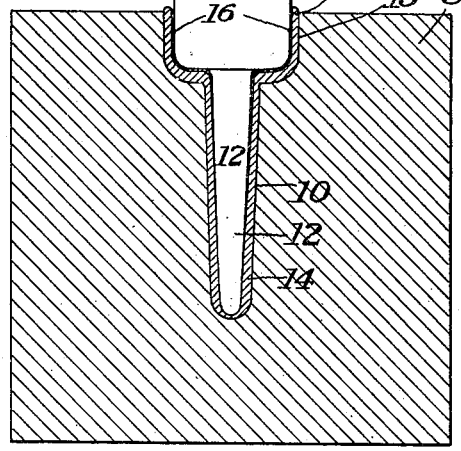
INVENTOR
Roland M. Kenah
by his attorneys April 18, 1939.  R. M. KENAH  2,155,274
MANUFACTURE OF COMPOSITE METALLIC STRUCTURES
Filed Dec. 21, 1934   2 Sheets-Sheet 2
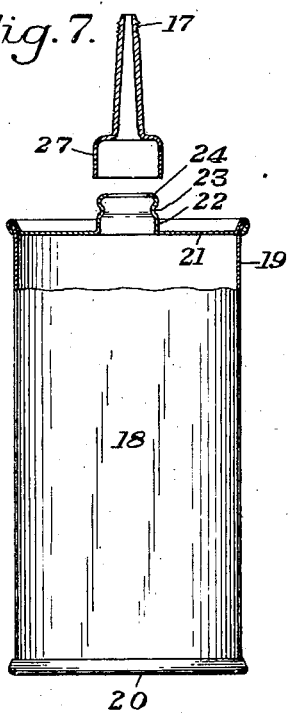
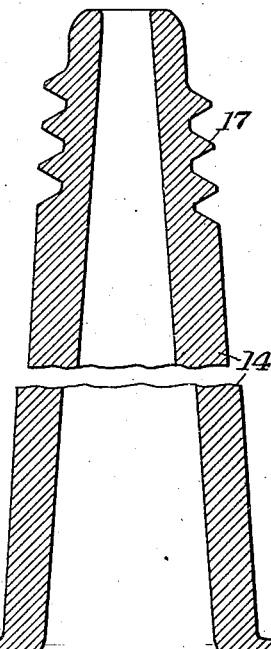
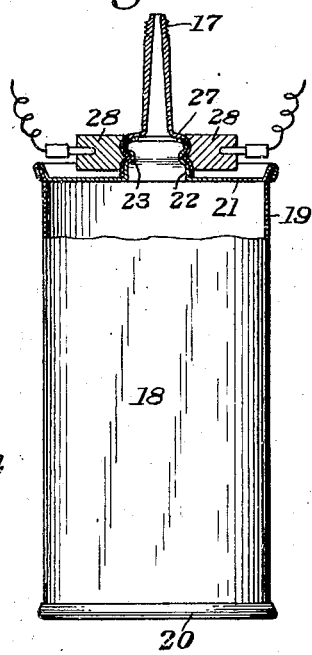
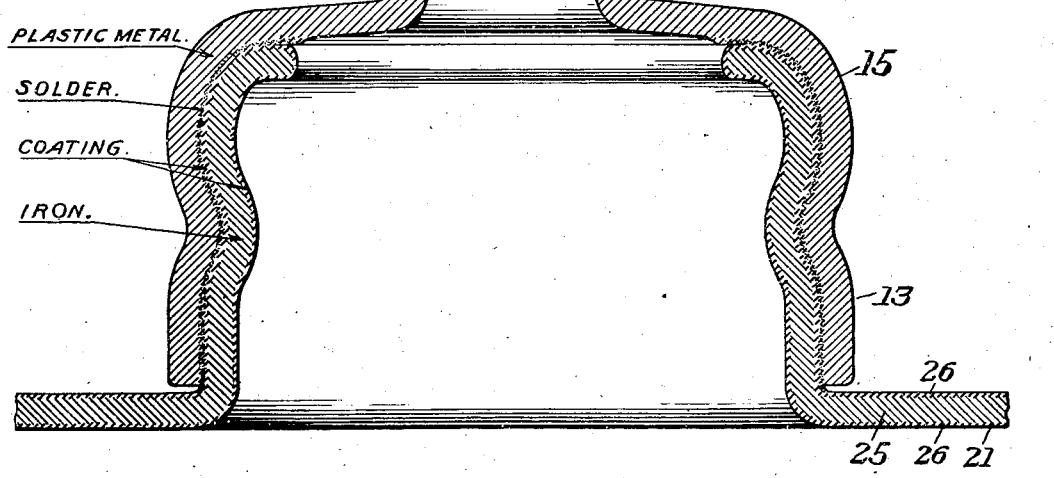
INVENTOR
Roland M. Kenah
by Byrnes, Stebbins, Barnes
his attorneys Patented Apr. 18, 1939

2,155,274

UNITED STATES PATENT OFFICE 2,155,274

MANUFACTURE OF COMPOSITE METALLIC STRUCTURES

Roland M. Kenah, New Brighton, Pa., assignor to Standard Specialty & Tube Company, New Brighton, Pa., a corporation of New Jersey Application December 21, 1934, Serial No. 758,563

7 Claims. (Cl. 29—148.2)

This invention relates broadly to the manufacture of composite metallic structures, and more particularly composite metallic structures made up of parts adapted to be bonded together, as by soldering.

In certain of its more specific aspects the invention relates to the manufacture of spouted containers, and especially containers having separate body and spout members which are bonded together. The invention further relates to a blank or spout member adapted for use in the manufacture of containers and to the manufacture of such blank or spout member.

In the copending application of Paul E. Brunberg, Serial No. 758,565, filed of even date herewith, there is disclosed and claimed a composite metallic structure and a method of manufacture of such a structure entailing the use of a bonding medium such as solder to bond together the component parts of the structure. In such application there is disclosed, purely by way of example, the manufacture of an oil can by providing separate can body and spout members, assembling such members with solder therebetween and melting and then hardening the solder to bond the parts together. If it is attempted to apply the solder to one or the other of the preformed container members difficulty is encountered in obtaining a smooth uniform layer of solder without wastage of solder, and the step of thus applying the solder is an undesirable and costly one.

I provide for the manufacture of composite metallic structures by forming a blank having solder applied thereto, shaping such blank to form a part adapted for incorporation in the composite metallic structure with the solder disposed at a predetermined position thereon, assembling such part with another part with the solder opposite a portion of such other part, and melting and then hardening the solder to bond the parts together. The solder is hardened by lowering the temperature below its melting point, and this may be done, for example, simply by removing the heating means. This eliminates the disadvantages incident to application of the solder to a preformed member and results in a superior product and in material reduction in manufacturing cost.

I preferably assemble a backing material with a layer of solder, as, for example, in the form of a bimetallic billet which may be rolled down to plate or sheet form of predetermined thickness, and I form therefrom, as, for example, by stamping or punching, one or more blanks suitable for shaping into the desired container member. Preferably the backing material is plastic metal, such, for example, as lead, tin, antimony, aluminum, etc., either singly or in combination. The blank is preferably die-formed or extruded to form the desired member, which may, for example, be a spout member, and on which the solder will be predeterminedly positioned. Such member may then be suitably assembled with a cooperating container member and with the solder opposite a portion of the latter, whereupon the solder is melted and then hardened to bond the members together. By the word "melted" I mean that the solder is rendered sufficiently plastic and is raised to a sufficient temperature to form the desired bond.

Other details, objects and advantages of the invention will become apparent as the following description of a present preferred embodiment thereof and of a present preferred method of practicing the same proceeds.

In the accompanying drawings I have shown a present preferred embodiment of the invention, in which Figure 1 is a cross-sectional view through a portion of a bimetallic billet;

Figure 2 is a cross-sectional view through a portion of a plate or sheet formed from the billet shown in Figure 1;

Figure 3 is a top plan view of a blank or slug formed from the plate or sheet shown in Figure 2;

Figure 4 is a transverse cross-sectional view through the blank or slug shown in Figure 3 and taken on the line IV—IV of that figure;

Figure 5 is a diagrammatic vertical transverse cross-sectional view through die-forming apparatus with the slug shown in Figures 3 and 4 in place therein and prior to the die-forming operation;

Figure 6 is a view similar to Figure 5 with the plunger in its lowermost position at the completion of the die-forming operation;

Figure 7 is an elevational view, partly in central vertical cross section, of the body member and the spout member of an oil can prior to their assembly in the manufacture of a spouted can;

Figure 8 is a view similar to Figure 7 but showing the spout member applied to the body member and also showing, purely diagrammatically, heated crimping dies which may be used to crimp the body and spout members together and melt the solder; and Figure 9 is a greatly enlarged partial central vertical cross-sectional view through a portion of the construction shown in Figure 8.

Purely for the sake of explanation and illustration the invention will be described in connection with the manufacture of an oil can.

Referring now more particularly to the drawings, there is shown in Figure 1 a bimetallic billet, designated generally by reference numeral 2, which comprises a base or backing portion 3 and a facing 4. The base or backing portion 3 may be of any suitable material, but in the example chosen will be considered as being of plastic material, such, for example, as lead, tin, antimony, aluminum, etc., either singly or in combination. The facing 4 is of solder, preferably a solder of tin and lead. A solder of 63% tin and 37% lead has been found especially well suited for my purpose when the plastic material is lead or a lead alloy. The bimetallic billet 2 is preferably formed by assembling the base or backing portion, which may be in billet form, and a sheet of the facing material or solder.

The bimetallic billet 2 is next compressed, as, for example, by rolling in any suitable rolling mill, the compressing ordinarily preferably being done cold, to produce a bimetallic plate or sheet of predetermined thickness shown in Figure 2 and designated generally by reference numeral 5. The compressing not only reduces the thickness of the bimetallic member but also assists in consolidating the facing and backing portions thereof.

Blanks or slugs as shown in Figures 3 and 4 are then formed from the bimetallic plate or sheet 5, this preferably being done by blanking or punching. For example, the blanks or slugs may be punched out of the bimetallic sheet, the punch and die being designed so that the slugs will have the shape shown. Each slug comprises a body portion 6 and a facing 7, the slug as a whole being dished concavely upwardly as shown in Figure 4. The slug may be in the form of a flat disc but is preferably formed of dish shape for a purpose now to be described.

The slug is placed with the facing 7 upwardly in a die cavity 8 formed in a die block 9. The die cavity 8 communicates with a lower portion 10 of greatly reduced size and being tapered as shown in Figures 5 and 6. By reason of the fact that the slug is dished as above explained it properly fits the die cavity and also is more readily adapted for the die-forming operation presently to be described. Still further, as it is very difficult upon inspection to determine which face of the slug has the facing 7 thereon, the cupping or dishing of the slug makes it possible to determine this at a glance, as it is known that the slugs are manufactured with the concave face on the same side as the facing 7.

The plunger which cooperates with the die block 9 is shown at 11 and has a reduced tapered nose 12. The plunger is of course suitably guided as well known in the art relative to the die block and, after the slug is positioned in the die cavity 8 as shown in Figure 5, the plunger is moved downwardly into the die cavity, the nose 12 of the plunger striking the center of the slug and the plunger being coaxial with the die cavities 8 and 10. The slug is shaped or die-formed into the form shown in Figure 6, this being a spout blank, designated generally by reference numeral 13. Such blank has a nose portion 14 and a skirt portion 15 and is partially internally lined with solder as shown at 16. In the die-forming operation the nose of the plunger probably passes completely through the solder facing on the slug so that the extremity of the nose portion of the spout blank may not be internally lined with solder. However, as will presently appear, it is immaterial whether or not the nose portion of the spout blank is internally lined with solder. The blank is so formed and the plunger and die so shaped that a lining of solder of substantially uniform thickness is formed within the skirt portion 15 of the spout blank after the die-forming operation, as shown in Figure 6.

The solder lining extends part way toward the nose of the spout blank, probably tapering off to zero thickness about half way between the skirt portion and the nose extremity of the blank. The lining of solder is firmly consolidated with the backing material and has a smooth exterior surface.

The plunger is then withdrawn and the blank 13 removed from the die cavity. Normally the blank adheres to the plunger and when the plunger is withdrawn the blank is withdrawn with it and the blank is thereafter removed from the plunger. The blank is then trimmed and its nose threaded as shown at 17 in Figures 7, 8 and 9, after which a cap is screwed on, thus forming a spout member which is finished except for application to the container. All of the operations in the formation of the spout member, including the assembly of the facing and backing portions of the bimetallic billet, the rolling of such billet, the formation of the slug, the die-forming operation to produce the spout blank and the threading, are preferably performed cold.

Referring now more particularly to Figures 7, 8 and 9, there is provided a container body member, designated generally by reference numeral 18, which may comprise a side wall portion 19 having a bottom 20 and a top 21 seamed thereto. The top 21 has an upwardly extending hollow projection or neck 22 having an annular inwardly depressed portion 23 and a rounded upper rim portion 24. The body member may be of oval or round cross section and such member, or at least the top 21 thereof (which responds to the term "body member" as used in the claims), is preferably, although not necessarily, of tin-plate, that is to say, ferrous sheet metal coated with tin and manufactured in the usual way. Tin-plate is ordinarily produced by dipping a ferrous metal sheet into a bath of molten tin so that usually the sheet is coated with tin on both sides. However, in the preferred construction shown in the drawings it is sufficient if the outside only of the top, or, for that matter, the neck 22 alone or, indeed, only the outer surface of the neck, be coated with tin.

When a sheet of ferrous metal is coated with tin an iron-tin alloy is formed, the coating ordinarily containing at least 4 per cent. of such alloy. This percentage ranges up to in the neighborhood of 17½ per cent. or over, depending upon the materials used and the process of manufacture. In Figure 9 the top 21 of the can is shown as comprising ferrous metal 25 having a tin coating 26 on both sides. No attempt is made to show the tin coating in Figures 7 and 8 due to their relatively small scale. Furthermore, the relative thicknesses of the ferrous material and the tin coating in Figure 9 are not intended to be accurate, this figure being purely diagrammatic and for the purpose of illustrating the invention as well as possible.

The body and spout members as above described are assembled by introduction of the neck 22 of the body member within the skirt 27 of the spout member, after first applying a suitable flux either to the interior of the skirt or to the exterior of the neck, the parts preferably being so proportioned that the inwardly directed portion of the spout member above the skirt will rest snugly upon the rim 24 of the neck. The diameter of the skirt is such that it snugly fits over the neck. Thus the solder is preferably in intimate contact both with the interior of the skirt of the spout member and with the exterior of the neck of the body member. When the parts are thus assembled heat is preferably applied to the assembled structure, this conveniently being done by bringing heated electrodes or dies into contact with the outer surface of the skirt 27. In Figure 8 there are shown heated crimping dies 28 which simultaneously apply heat and crimping pressure to crimp the skirt about the neck of the body member and with a portion lying within and against the portion 23 of the neck. The dies may be of any suitable form, the showing of Figure 8 being purely diagrammatic.

Whether or not the skirt of the spout member is crimped about the neck of the body member, pressure between the skirt and neck is preferably applied, which, if there is to be no crimping, may be done by pressure applying members similar to the dies 28 but without the projections for forcing the portion of the skirt within the portion 23 of the neck. In fact, it is possible to do away entirely with the portion 23 of the neck and to simply press the skirt and neck firmly together while applying heat. Alternatively, the skirt and neck may be deformed or crimped together either before or after the application of heat instead of simultaneously therewith.

The application of heat raises the temperature of the assembled structure to a point above the melting point of the solder but below the melting points of the materials of which the body and spout members are made. The entire assembled structure is, however, heated sufficiently that a portion of the body member and a portion of the spout member enter into a solid chemical solution with the solder whereby to form a strong and permanent bond between the respective members. The bond is made up of the solder having adjacent one side a solid chemical solution between the solder and the plastic metal and having adjacent the other side a solid chemical solution between the solder and the iron-tin alloy in the tin coating on the body member.

No limitation is intended to be imposed by the above description of the theory of action as at present understood. The method described may also be used to advantage in attaching spout members to container body members when the parts are made of materials other than those specifically referred to herein. The method above described of forming a container member with a lining or layer of solder suitably positioned for cooperation with another member upon assembly to join the members together enables the manufacture in an exceptionally simple, easy and economical manner of an improved product.

It is to be understood that the can or body member is filled with oil before the spout member is applied and that the usual screw cap is applied to the outlet of the spout member.

While I have shown and described a present preferred embodiment of the invention and a present preferred method of practicing the same, it is to be distinctly understood that the invention is not limited thereto but may be otherwise variously embodied and practiced within the scope of the following claims.

I claim:

1. A method of making composite metallic structures, comprising forming a bimetallic billet comprising a metal backing and a facing of solder, rolling said billet into sheet-like form, blanking therefrom a bimetallic blank of predetermined size and shape, shaping said bimetallic blank to form a part adapted for incorporation in a composite metallic structure with the solder disposed at a predetermined position thereon, assembling said part with another part with the solder in contact with said other part, and melting and then hardening the solder to bond said parts together.

2. A method of making spouted containers, comprising providing a container body member, cold forming a spout member having a portion adapted to interfit with a portion of the body member and with a layer of solder on said portion of the spout member, interfitting said body and spout members with said layer of solder opposite said portion of the body member, and melting and then hardening the solder to bond said members together.

3. A method of making spouted containers, comprising providing a container body member, providing a metal blank having solder thereon, deforming said blank to form a spout member adapted to interfit with said container body member, interfitting said body and spout members with at least a portion of the solder opposite a portion of the body member, and melting and then hardening the solder to bond said members together.

4. A method of making spouted containers, comprising providing a container body member having a projection, providing a metal blank having solder thereon, die-forming said blank to form a spout member having a portion adapted to receive the projection of the body member and with at least a portion of the solder disposed at the inner surface of said portion of the spout member, inserting said projection of the body into said portion of the spout member, and melting and then hardening the solder to bond said members together.

5. A method of making spouted containers, comprising providing a container body member of tin coated ferrous material, providing a plastic metal blank having solder thereon, deforming said blank to form a spout member adapted to interfit with said container body member, interfitting said body and spout members with at least a portion of the solder opposite a portion of the body member, and melting and then hardening the solder to bond said members together.

6. A method of making spouted containers, comprising providing a container body member having a projection of tin coated ferrous material, providing a blank a plastic metal comprising lead and having solder thereon, die-forming said blank to form a spout member having a skirt portion adapted to receive the projection of the body member and with at least a portion of the solder disposed at the inner surface of said skirt portion of the spout member, inserting said projection of the body member into said skirt portion of the spout member with the solder opposite the tin coating of said projection, and melting and then hardening the solder to bond said members together.

7. A method of making a solder-lined plastic metal spout adapted to be soldered over a container neck, comprising forming a plastic metal blank having solder applied thereto and die-forming said blank into said spout and in such manner as to dispose the solder at at least a portion of the interior of said spout to enable soldering the same to the container neck simply by positioning the spout thereover and application of heat.

ROLAND M. KENAH.